(12) United States Patent
Kuo et al.

(10) Patent No.: US 6,684,337 B1
(45) Date of Patent: Jan. 27, 2004

(54) CHARGING SYSTEM INCORPORATED IN COMPUTER FOR CHARGING AND RESETTING WIRELESS PERIPHERAL DEVICES

(75) Inventors: Shyh-Ren Kuo, Taipei (TW); Chris Wang, Taipei (TW); Leo Kuan, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 553 days.

(21) Appl. No.: 09/604,409

(22) Filed: Jun. 27, 2000

(51) Int. Cl.$^7$ ................................................. G06F 1/26
(52) U.S. Cl. ........................................ 713/300; 455/573
(58) Field of Search ................................. 713/300, 320, 713/340; 345/157, 163, 168, 169; 455/572–575, 90

(56) References Cited

U.S. PATENT DOCUMENTS

| 4,625,274 A | * | 11/1986 | Schroeder | ........................ 713/1 |
| 5,794,116 A | * | 8/1998 | Matsuda et al. | ............. 725/114 |
| 5,920,306 A | * | 7/1999 | Kikinis | ........................ 345/158 |
| 6,304,250 B1 | * | 10/2001 | Yang et al. | ................. 345/168 |
| 6,476,795 B1 | * | 11/2002 | Derocher et al. | ............ 345/163 |

FOREIGN PATENT DOCUMENTS

WO          WO 9944268 A1 * 9/1999 ............. H02J/7/00

OTHER PUBLICATIONS

Cawley, K. Power Supply Transient Response Considerations for Testing Portable Wireless Devices, Oct. 22–24, 1996, WESCON/96, pp. 123–126.*

* cited by examiner

Primary Examiner—Thomas Lee
Assistant Examiner—Thuan Du
(74) Attorney, Agent, or Firm—Rosenberg, Klein & Lee

(57) ABSTRACT

A charging system is incorporated in a computer communicable through a predetermined communication channel with a wireless peripheral device having a predetermined identification code. The charging system includes a charging device mounted to and in electrical connection with the computer. The charging device has a positive terminal, a negative terminal and a reset terminal. A rechargeable device is mounted in the wireless peripheral device. The rechargeable device includes a positive terminal, a negative terminal and a reset terminal corresponding to and engageable with the terminals of the charging device. The wireless peripheral device is selectively attached to the computer with the terminals engage each other to conduct an electrical current from the computer to the rechargeable device of the peripheral device and to reset/identify the communication channel and the identification code.

8 Claims, 1 Drawing Sheet

CHARGING SYSTEM INCORPORATED IN COMPUTER FOR CHARGING AND RESETTING WIRELESS PERIPHERAL DEVICES

FIELD OF THE INVENTION

The present invention generally relates to a system incorporated in a computer for charging wireless peripheral devices during the shut down period of the computer.

BACKGROUND OF THE INVENTION

Computers are operated by means of peripheral devices. The peripheral devices are connected to a computer by means of cables. The cables, however, interfere with the activity of a computer user and may hinder efficient use of the space in which the computer is installed. To overcome such a problem, wireless peripheral devices are developed. Each wireless peripheral device is assigned a particular identification code and is communicable with the computer via a particular communication channel in order to prevent interference with each other.

Since the wireless peripheral devices are not connected to the computer by cables, they require independent power sources, such as battery, to support their operation. The battery, however, has a very limited service life and thus must be replaced or recharged (for a rechargeable battery) constantly.

Thus, it is desired to have a charging system which allows the peripheral devices to be constantly charged for solving the above problems.

SUMMARY OF THE INVENTION

Accordingly, an object of the present invention is to provide a charging system for constantly charging rechargeable wireless peripheral devices of a computer.

Another object of the present invention is to provide a device for directly connecting a wireless peripheral device to a computer for resetting/identifying the communication channel and the identification code thereof.

In accordance with the present invention, there is provided a charging system comprising incorporated in a computer communicable through a predetermined communication channel with a wireless peripheral device having a predetermined identification code. The charging system includes a charging device mounted to and in electrical connection with the computer. The charging device has a positive terminal, a negative terminal and a reset terminal. A rechargeable device is mounted in the wireless peripheral device. The rechargeable device includes a positive terminal, a negative terminal and a reset terminal corresponding to and engageable with the terminals of the charging device. The wireless peripheral device is selectively attached to the computer with the terminals engage each other to conduct an electrical current from the computer to the rechargeable device of the peripheral device and to reset/identify the communication channel and the identification code.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

The present invention provides a charging system incorporated in a computer, especially a personal computer, and electrically connected to a power supply of the computer for being selectively in connection with wireless peripheral devices of the computer during the shut down period of the computer. Such a system allows a user to constantly charge the rechargeable battery sets of the peripheral devices without interfering with the operation of the computer.

Figure 1:
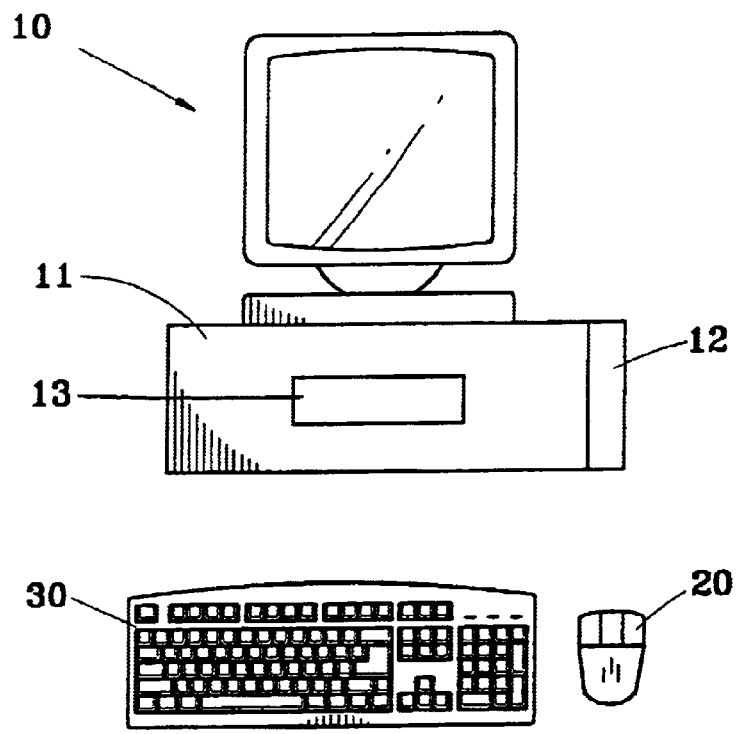
FIG. 1 is a schematic view showing a computer system incorporating a charging system in accordance with the present invention.

Referring to the drawings and in particular to FIG. 1, a computer system is shown comprising a computer host device 11 having a display (not labeled) and a plurality of wireless peripheral devices, including, but not limited to, a wireless keyboard 30 and a wireless mouse 20. A writing board and a joystick are another two examples of the peripheral devices. A first transmitting/receiving module 13 is arranged in the host device 11 for receiving electromagnetic signals from the peripheral devices 20, 30.

In accordance with the present invention, a charging device 12 is incorporated in the computer system by being fixed to the host device 11 and electrically connected to a power supply of the host device 11.

Figure 2:
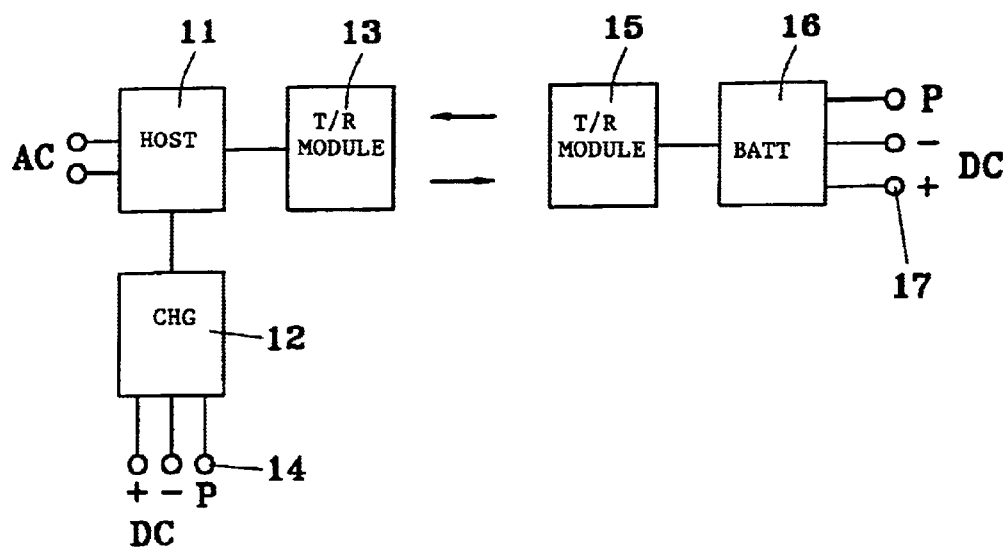
FIG. 2 is a block diagram of the charging system in accordance with the present invention.

Also referring to FIG. 2, the host device 11 is powered by an external power source (denoted by "AC") via for example a switching power supply. The first transmitting/receiving module 13 is electrically coupled to the host-device 11 for receiving/transmitting signals from/to the host device 11. The charging device 12 is electrically connected to the host device 11 for receiving power and signal from the host device 11. The charging device 12 comprises three contacts, a positive terminal (denoted by "+" sign), a negative terminal (denoted by "−" sign) and a reset terminal (denoted by letter "P").

Each of the peripheral devices 20, 30 comprises a rechargeable device, such as a secondary battery set 16, to which a second transmitting/receiving module 15 is connected for wirelessly linking to the first transmitting/receiving module 13 to establish wireless communication between the host device 11 and the peripheral device 20, 30. As is well known, the wireless communication between the first and second transmitting/receiving modules 13, 15 is based on a particular communication channel assigned to the particular peripheral device. Each peripheral device 20, 30 generates a particular identification code to the host device 11 whereby the peripheral device 20, 30 can be effectively recognized by the host device 11.

The rechargeable battery set 16 form three terminals 17 (respectively denoted by "+", "−" and "P") corresponding to the terminals 14 of the host device 11. When the host device 11 is shut down, in other words, the peripheral devices 20, 30 are not in operation, the peripheral device 20, 30 may be attached to the host device 11 to have the terminals 17 of the peripheral device 20, 30 engage with the terminals 14 of the host device 11. The "+"and "−" terminals allow electrical current, preferably direct current, to be supplied from the host device 11 to the rechargeable battery set 16 of the peripheral device 20, 30 for charging the latter.

The reset terminals "P" establish a direct connection between the host device 11 and the peripheral device 20, 30. A reset signal may be issued by the host device 11 to the peripheral device 20, 30 for resetting/changing the identification code generated by the peripheral device 20, 30 and the communication channel that the particular peripheral device 20, 30 is taken to communicate with the host device 11.

Circuits of power supplying, charging and communication are well known to those skilled in the art and constitute no novel parts of the present invention. Thus, the circuits will not be described in detail herein.

Since most of the computer users are used to putting the peripheral devices closed to or mechanically coupling the peripheral devices to the host device when not using the computer, it is advisable to combine a mechanical coupling device (not shown) with the charging device 12 whereby when the user attaches a peripheral device to the host device by means of the mechanical coupling device, an electrical connection is automatically formed between the terminals 14, 17. Thus, the user does not need to take additional steps to charge the rechargeable battery set of the peripheral device. For example, the peripheral device may comprise a casing and the terminals are formed on the casing for readily engaging terminals of the host device 11.

It is also apparent to those having ordinary skills to change the configuration of the charging device 12 for mechanically and electrically coupling different peripheral devices. In addition, the peripheral device may be connected to the host device by means of a cord or a cable whereby the peripheral device is allowed to charge at a location distanced from the host device. For example, the cable may form a plug (comprising terminals 17) which is insertable into a socket (comprising the terminals 14) formed on the host device. Alternatively, the plug may be directly formed on the peripheral device, for example on the casing of the peripheral device.

Although the present invention has been described with respect to the preferred embodiment, it is contemplated that a variety of modifications, variations and substitutions may be done without departing from the scope of the present invention that is intended to be defined by the appended claims.

What is claimed is:

1. A charging system incorporated in a computer communicable through a predetermined communication channel with a wireless peripheral device having a predetermined identification code, the charging system comprising:

a charging device mounted to and maintained in electrical connection with the computer, the charging device comprising at least three first electrical terminals, at least one of the first electrical terminals forming a dedicated reset terminal; and a rechargeable device mounted in the wireless peripheral device, the rechargeable device comprising at least three second electrical terminals corresponding to the first electrical terminals;

wherein the wireless peripheral device is a computer user interface device attachable to the computer with the first and second terminals engaging each other to conduct an electrical current from the computer to the rechargeable device of the peripheral device and to reset/identify the communication channel and the identification code.

2. The charging system as claimed in claim 1, wherein the peripheral device is selected from a group of computer peripheral devices comprising a keyboard, a mouse, a writing pad, and a joystick.

3. The charging system as claimed in claim 1, wherein the terminals of both the charging device and the rechargeable device comprise a positive terminal and a negative terminal for conducting an electrical current from the computer to the peripheral device and a reset terminal for resetting/identifying the communication channel and the identification code.

4. The charging system as claimed in claim 1, wherein the peripheral device comprises a casing with the second terminals formed on the casing.

5. The charging system as claimed in claim 1, wherein the first terminals form a plug and the second terminals form a socket.

6. The charging system as claimed in claim 1, wherein the second terminals are formed on a remote end of a cable extending from the peripheral device.

7. The charging system as claimed in claim 1 comprising a plurality of the wireless peripheral devices, the wireless peripheral devices being concurrently operable and including a wireless keyboard and a wireless pointing device.

8. A charging system incorporated in a computer communicable through a predetermined communication channel with a wireless keyboard device and a wireless mouse device each having a predetermined identification code, the charging system comprising:

a charging device mounted to and maintained in electrical connection with the computer, the charging device including at least three first electrical terminals, at least one of the first electrical terminals forming a dedicated reset terminal; and a plurality of rechargeable devices respectively mounted in the wireless keyboard and mouse devices, each of the rechargeable devices including at least three second electrical terminals corresponding to the first electrical terminals;

wherein each of the wireless keyboard and mouse devices is attachable to the computer with the corresponding first and second terminals engaging each other to conduct electrical current from the computer to the rechargeable device of the wireless device and to reset and identify the communication channel and the identification code.

* * * * *